(12) United States Patent
Thapliya et al.

(10) Patent No.: US 7,155,088 B2
(45) Date of Patent: Dec. 26, 2006

(54) OPTICAL MODULATOR AND OPTICAL MODULATOR ARRAY

(75) Inventors: Roshan Thapliya, Ebina (JP);
Yasunori Okano, Ebina (JP);
Shigetoshi Nakamura, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 35 days.

(21) Appl. No.: 10/936,599

(22) Filed: Sep. 9, 2004

(65) Prior Publication Data

US 2005/0175281 A1 Aug. 11, 2005

(30) Foreign Application Priority Data

Feb. 9, 2004 (JP) .............................. 2004-032575

(51) Int. Cl.
*G02B 6/26* (2006.01)
*G02B 6/42* (2006.01)

(52) U.S. Cl. .............................. 385/28; 385/3; 385/40; 385/43; 385/50; 385/129; 385/132

(58) Field of Classification Search .................. 385/28, 385/40, 43, 50, 129, 132, 2, 3
See application file for complete search history.

(56) References Cited

U.S. PATENT DOCUMENTS

| 5,074,631 A | 12/1991 | Hamano et al. |
| 6,026,205 A * | 2/2000 | McCallion et al. ........... 385/30 |
| 6,618,179 B1 | 9/2003 | Kalluri et al. |
| 6,643,419 B1 | 11/2003 | Chang et al. |

OTHER PUBLICATIONS

Kazuto Noguchi et al., "A Broadband Ti: LiNbO$_3$ Optical Modulator with A Ridge Structure", *IEEE Journal of Lightwave Technology*, vol. 13, No. 6, pp. 1164-1168, Jun. 1995.
L. W. Cahill et al., "Switching Properties of Generalized Mach-Zehnder Photonic Switches", *Proceedings of CLEO/Pacific Rim 2001*, pp. 238-239.
Yen-Juei Lin et al., "Four-channel Course-wavelength Division Multiplexing Demoltiplexer With A Modified Mach-Zehnder Interferometer Configuration On A Silicon-On-Insulator Waveguide", *Applied Optics*, vol. 42, No. 15, pp. 2689-2694, May 2003.

* cited by examiner

*Primary Examiner*—Brian Healy
*Assistant Examiner*—Michael P. Mooney
(74) *Attorney, Agent, or Firm*—Oliff & Berridge, PLC

(57) ABSTRACT

An optical modulator is provided with an optical waveguide including an input-side single-mode waveguide for propagating inputted light at single mode, a multi-mode waveguide for propagating the light propagated from the input-side single-mode waveguide at plural guided modes, and an output-side single-mode waveguide for propagating the light propagated from the multi-mode waveguide at single mode to output the light. A lower electrode layer is disposed below the multi-mode waveguide, and an upper electrode is disposed above the multi-mode waveguide. The upper electrode cooperates with the lower electrode layer to apply an electric field to the multi-mode waveguide. A phase of each of the guided modes propagating through the multi-mode waveguide is modulated by applying an electric field to the multi-mode waveguide, and intensity of the light outputted from the output-side single-mode waveguide is modulated by an interference of the phase-modulated guided modes.

21 Claims, 14 Drawing Sheets

F I G. 1
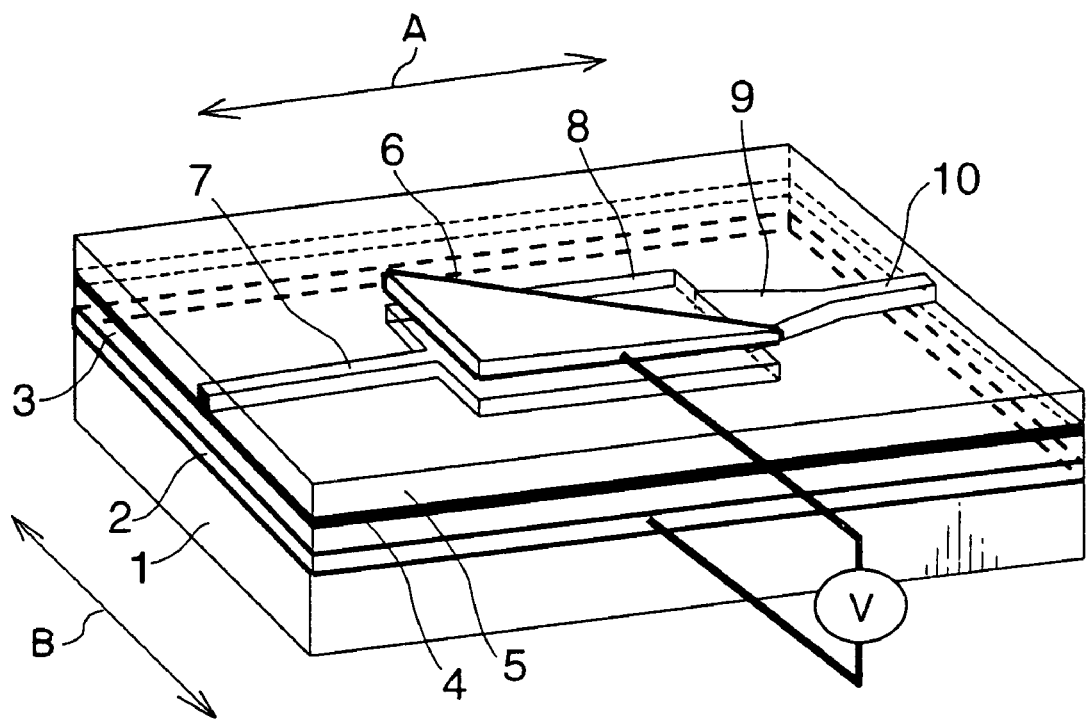

F I G. 2
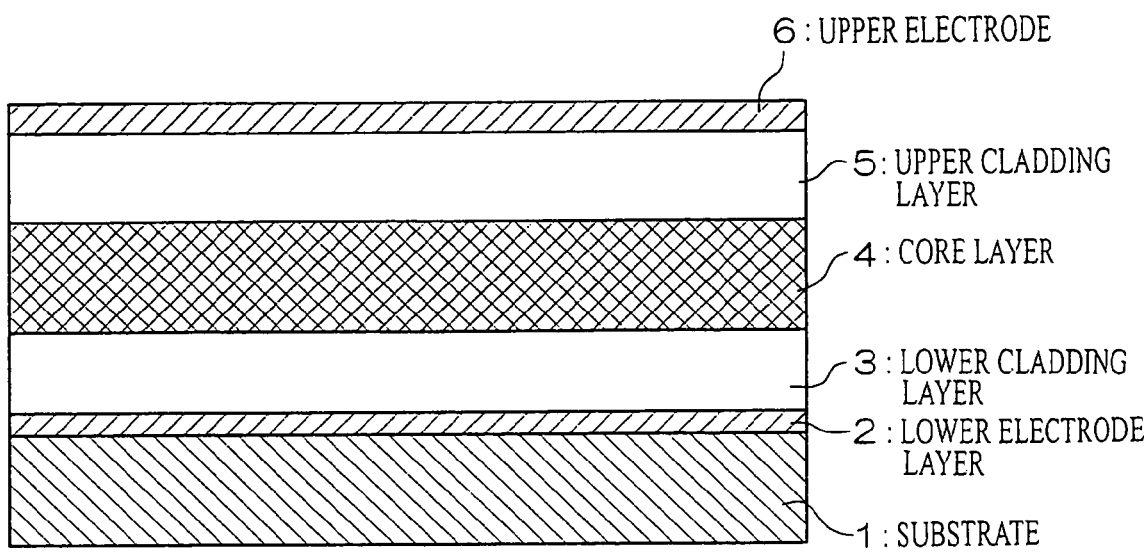
$n_{uc}$ : REFRACTIVE INDEX OF UPPER CLADDING LAYER
$n_{core}$ : REFRACTIVE INDEX OF CORE LAYER
$n_{lc}$ : REFRACTIVE INDEX OF LOWER CLADDING LAYER

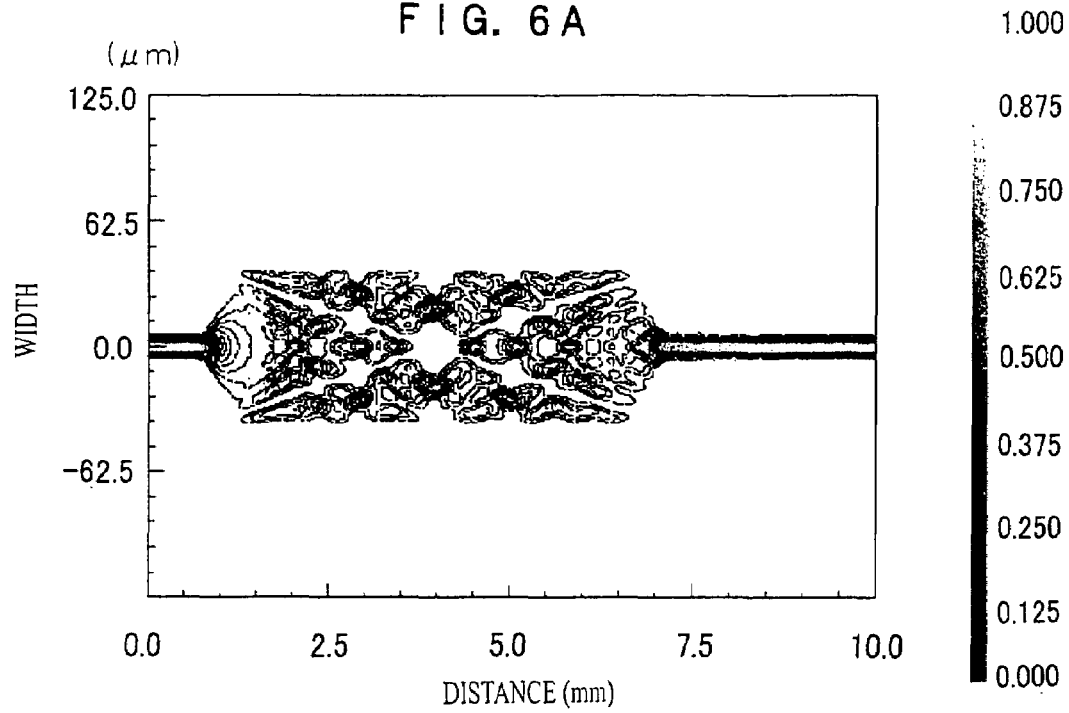
F I G. 6A
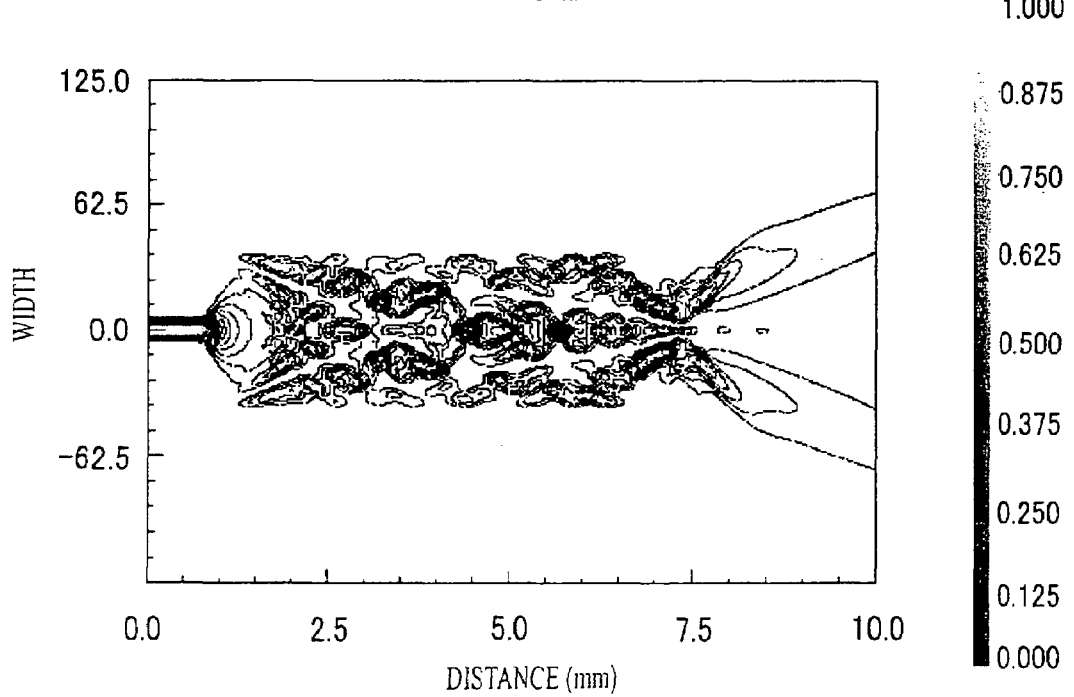
F I G. 6B

Case 1

Case 2

Case 3

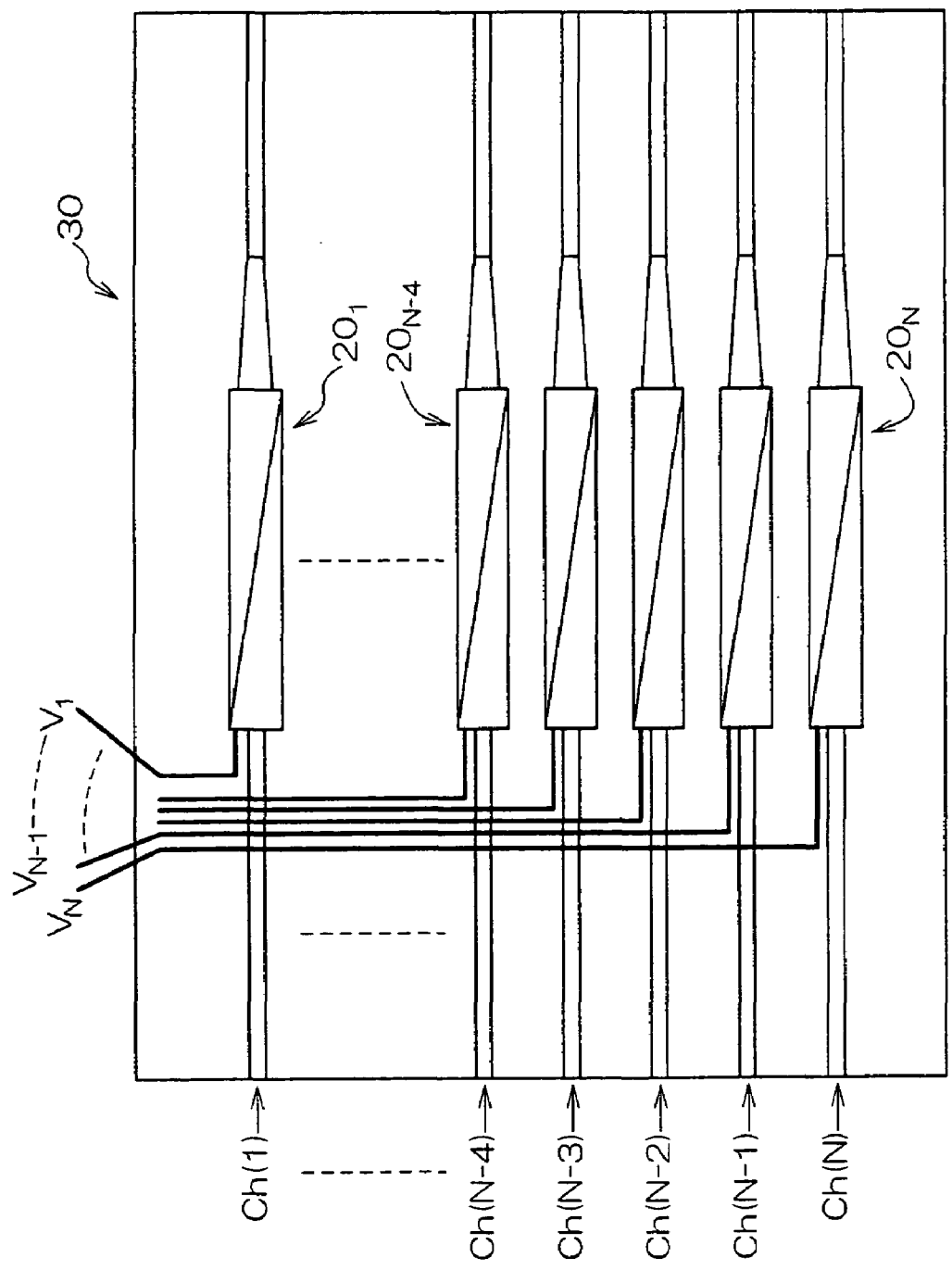

OPTICAL MODULATOR AND OPTICAL MODULATOR ARRAY

CROSS-REFERENCE TO RELATED APPLICATION

This application claims priority under 35 USC 119 from Japanese Patent Application No. 2004-32575, the disclosure of which is incorporated by reference herein.

BACKGROUND OF THE INVENTION

1. Field of the Invention

The present invention relates to, an optical modulator and an optical modulator array. More particularly, the invention relates to an optical modulator and an optical modulator array that modulate an optical signal by utilizing interference between plural rays of guided mode light propagating through multi-mode interference waveguide.

2. Description of the Related Art

Transmission systems that are capable of manipulating the phase and intensity of optical signals are very important. The most common devices among devices for modulating the phase and intensity of optical signals are optical modulators, which have rapidly become key devices. It should be noted that optical attenuators for attenuating the intensity of optical signals are also included in optical modulators in a broad sense. Conventionally used optical modulators include the Pockels cell and the Mach-Zehnder Modulator (MZM).

The Pockels cell is an optical modulator that performs modulation by utilizing the Pockels effect, which is an electro-optic effect. In this device, an electric field is externally applied on an electro-optical crystal disposed between a pair of polarizers, and change in refraction is induced by the applied electric field. The first polarizer splits the input optical signal into linear polarized components having mutually orthogonal vector directions (TE mode and TM mode). When light propagates through the crystal, the TE mode and the TM mode experience different changes in phases due to the applied electric field and only the predetermined polarized component is transmitted through the subsequent polarizer, which is determined by the difference in the induced phase differences between the TE and TM modes. Thus, the intensity of the optical signal is modulated according to the applied electric field.

The Mach-Zehnder Modulator forms a Mach-Zehnder interferometer by using, for example, a Y-branch waveguide, and it is an optical modulator that effects intensity modulation by utilizing an electro-optic effect, and the like. In this device, an optical path of an optical signal is split into two optical paths, and optical signals from these two optical paths are recombined to form an interference fringe. When an electric field is applied on a waveguide arm of each of the optical paths, a phase shift is caused between the optical signals from the two optical paths and the interference pattern is changed. Thus, the intensity of the optical signal is continuously modulated according to the applied electric field.

Among the above-described conventional optical modulators, the Pockels cells are easily fabricated, however, the difference between amounts of phase modulation of the induced TE mode and TM mode causes the overall phase shift to be relatively smaller. Therefore, they usually require a relatively large voltage to be applied on the optical crystal. On the other hand, in the Mach-Zehnder Modulators, it is not necessary to limit the applied voltage, and only the phase modulation of one of the polarization modes is required. Hence, as stated above, the Mach-Zehnder Modulator can provide a larger effect, and therefore is a more preferable choice than the Pockels cell.

Although the Mach-Zehnder Modulators are widely used for the above-described reasons, fabrication conditions for these devices are quite severe, resulting in low production yield. For example, when an inputted optical signal is split into two, ideally, the optical signal must be split precisely in half to obtain a maximum extinction ratio. Splitting of an optical signal is usually achieved by using a Y-branch waveguide or an optical directional coupler.

When the Y-branch waveguide is used, it is necessary to precisely conduct the tip formation of the branch, and use of high-performance steppers, which allow high-resolution photolithography, is required in order to achieve a high yield. As the optical directional coupler, for example, an optical waveguide-type optical coupler is known, wherein two mutually parallel optical waveguides are provided to be partially in close vicinity to each other. However, branching ratios of such optical directional couplers are very sensitive to materials (for example, refractive indices) and production conditions (for example, degrees of channel separations), which make these devices generally non-robust.

For example, with respect to Mach-Zehnder Modulators having a Y-branch waveguide, a number of improvements on the electro-optic effect have been proposed (see U.S. Pat. No. 5,074,631; and K. Noguchi et al., "A broadband Ti: LiNbO$_3$ optical modulator with ridge structure", IEEE Journal of Lightwave Technol., No. 13, pp. 1164–1168). However, a decrease in an extinction ratio due to uneven optical power splitting is not mentioned in these documents. Further, importance of robustness of the devices is not mentioned in these documents.

Recently, a Mach-Zehnder Modulator, which employs a multi-mode interferometer (MMI) device instead of a Y-branch waveguide in order to achieve even splitting of an optical power, has been proposed (see U.S. Pat. No. 6,618, 179). The multi-mode interferometer device has a wide optical waveguide, and utilizes an interference between a plural rays of guided mode light propagating through the waveguide to control light beams. Further, it is also described in this document that N×N optical switches can be formed using N-branch multi-mode interferometer devices.

However in this optical modulator, it is necessary to provide a Y-branch waveguide at the recombination side in order to achieve low loss. That is, the multi-mode interferometer device is used only for splitting an optical power. Further, phase modulation is performed for each of the split optical paths, and therefore, the multi-mode interferometer device is used merely as a passive device, which makes no contribution in increasing an output power. Therefore, the multi-mode interferometer device provides no advantage, other than enabling the even splitting of an optical power, over conventional Mach-Zehnder Modulators.

There are other examples, where a multi-mode interferometer device is used as an optical branching device or an optical coupling device in optical switches (see U.S. Pat. No. 6,643,419; L. W. Cahill et al., "Switching Properties of Generalized Mach-Zehnder Photonic Switches", Proceedings of CLEO/Pacific Rim 2001, pp. 238–239; and Yen-Juei Lin et al., "Four-channel coarse-wavelength division multiplexing demultiplexer with a modified Mach-Zehnder interferometer configuration on a silicon-on-insulator waveguide", Appl. Opt., No. 15, pp. 2689–2694). However, in any of these examples, phase modulation is performed for each of the split optical paths and the multi-mode interferometer device is used merely as a passive device. Therefore, conventionally, no optical modulator has been existed, in which a multi-mode interferometer device is employed as an active device involved in phase modulation.

As described above, the currently widely used Mach-Zehnder Modulators, which use a Y-branch waveguide and/or an optical directional coupler, are not capable of evenly splitting an optical power, and have a problem that it is difficult to produce highly precise optical modulators with a high production yield.

On the other hand, Mach-Zehnder Modulators, which employ a multi-mode interferometer device for an optical branching device, or the like, have been proposed in order to achieve even splitting of an optical power. However, in such optical modulators, the multi-mode interferometer device is used merely as a passive device, and therefore, no optical modulator has been existed, in which the multi-mode interferometer device is employed as an active device involved in phase modulation.

SUMMARY OF THE INVENTION

The present invention has been accomplished in order to solve the above-described problems, and provides an optical modulator and an optical modulator array, which are easily produced, have excellent robustness, and have a novel structure which allows high degree of freedom in design and highly controlled modulation of light intensity.

According to a first aspect of the invention, there is provided an optical modulator including: an optical waveguide formed by laminating on a substrate a core layer and a pair of cladding layers sandwiching the core layer, the optical waveguide having an input-side single-mode waveguide for propagating inputted light at single mode, a multi-mode waveguide for propagating the light propagated from the input-side single-mode waveguide at plural guided modes, and an output-side single-mode waveguide for propagating the light propagated from the multi-mode waveguide at single mode to output the light; a lower electrode layer disposed below the multi-mode waveguide; and an upper electrode disposed above the multi-mode waveguide, the upper electrode cooperating with the lower electrode layer to apply at least one of an electric field and heat to the multi-mode waveguide, wherein a phase of each of the guided modes propagating through the multi-mode waveguide is modulated by applying at least one of an electric field and heat to the multi-mode waveguide, and intensity of the light outputted from the output-side single-mode waveguide is modulated by an interference of the phase-modulated guided modes.

According to a second aspect of the invention, there is provided an optical modulator array including plural optical modulators arranged in an array, each of the optical modulators containing: an optical waveguide formed by laminating on a substrate a core layer and a pair of cladding layers sandwiching the core layer, the optical waveguide having an input-side single-mode waveguide for propagating inputted light at single mode, a multi-mode waveguide for propagating the light propagated from the input-side single-mode waveguide at plural guided modes, and an output-side single-mode waveguide for propagating the light propagated from the multi-mode waveguide at single mode to output the light; a lower electrode layer disposed below the multi-mode waveguide; and an upper electrode disposed above the multi-mode waveguide, the upper electrode cooperating with the lower electrode layer to apply at least one of an electric field and heat to the multi-mode waveguide, wherein a phase of each of the guided modes propagating through the multi-mode waveguide is modulated by applying at least one of an electric field and heat to the multi-mode waveguide, and intensity of the light outputted from the output-side single-mode waveguide is modulated by an interference of the phase-modulated guided modes.

According to a third aspect of the invention, there is provided an optical modulator including: an optical waveguide formed by laminating on a substrate a core layer and a pair of cladding layers sandwiching the core layer, the optical waveguide having an input-side single-mode waveguide for propagating inputted light at single mode, a multi-mode waveguide for propagating the light propagated from the input-side single-mode waveguide at plural guided modes, and an output-side single-mode waveguide for propagating the light propagated from the multi-mode waveguide at single mode to output the light; a lower electrode layer disposed below the multi-mode waveguide; and a strip upper electrode disposed to intersect with a propagating direction of light above the multi-mode waveguide, the strip upper electrode cooperating with the lower electrode layer to apply a microwave to the multi-mode waveguide, wherein a phase of each of the guided modes propagating through the multi-mode waveguide is modulated by applying a microwave to the multi-mode waveguide, and intensity of the light outputted from the output-side single-mode waveguide is modulated by an interference of the phase-modulated guided modes.

According to a fourth aspect of the invention, there is provided an optical modulator array including plural optical modulators arranged in an array, each of the optical modulators containing: an optical waveguide formed by laminating on a substrate a core layer and a pair of cladding layers sandwiching the core layer, the optical waveguide having an input-side single-mode waveguide for propagating inputted light at single mode, a multi-mode waveguide for propagating the light propagated from the input-side single-mode waveguide at plural guided modes, and an output-side single-mode waveguide for propagating the light propagated from the multi-mode waveguide at single mode to output the light; a lower electrode layer disposed below the multi-mode waveguide; and a strip upper electrode disposed to intersect with a propagating direction of light above the multi-mode waveguide, the strip upper electrode cooperating with the lower electrode layer to apply a microwave to the multi-mode waveguide, wherein a phase of each of the guided modes propagating through the multi-mode waveguide is modulated by applying a microwave to the multi-mode waveguide, and intensity of the light outputted from the output-side single-mode waveguide is modulated by an interference of the phase-modulated guided modes.

The optical modulator and the optical modulator array of the invention are effective in that they are easily produced and have excellent robustness, as well as they allow high degree of freedom in design and highly controlled modulation of intensity of light.

BRIEF DESCRIPTION OF THE DRAWINGS

Hereinafter, an embodiment of the present invention will be described in detail with reference to the appended drawings, wherein:

FIG. 1 is a perspective view schematically illustrating an optical modulator according to an embodiment of the invention;

FIG. 2 is a side cross-sectional view illustrating the optical modulator;

FIG. 6A illustrates a state of light inputted to the optical modulator where no electric field is applied to a multi-mode waveguide, and FIG. 6B illustrates a state of light inputted to the optical modulator where an electric field is applied to the multi-mode waveguide;

FIG. 10 is a schematic diagram illustrating a variable optical attenuator array, to which the optical modulator of the invention is applied;

DETAILED DESCRIPTION OF THE INVENTION

Figure 3:
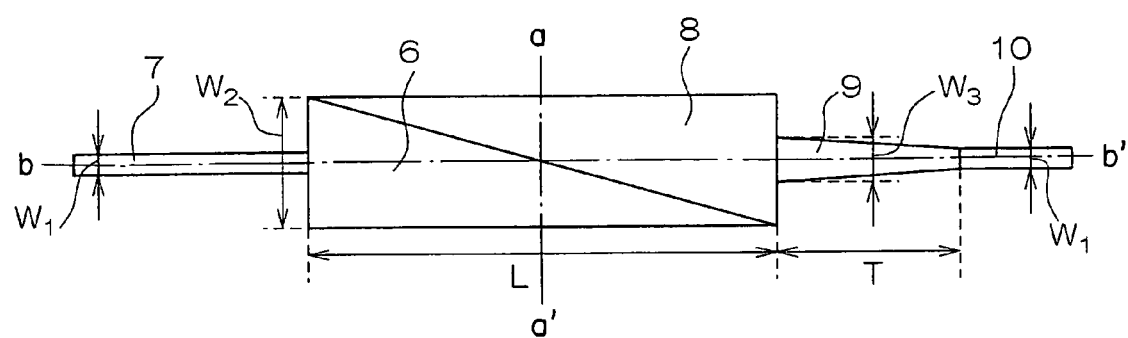
FIG. 3 is a plan view illustrating a positional relationship between a waveguide and an upper electrode of the optical modulator.

As shown in FIGS. 1 and 2, an optical modulator according to this embodiment includes a substrate 1, a lower electrode layer 2 laminated on the substrate 1, a lower cladding layer 3 laminated on the lower electrode layer 2, a core layer 4 laminated on the lower cladding layer 3, an upper cladding layer 5 laminated on the core layer 4, and an upper electrode 6 laminated on the upper cladding layer 5.

Where a refractive index of the lower cladding layer 3 is $n_{lc}$, a refractive index of the core layer 4 is $n_{core}$, and a refractive index of the upper cladding layer 5 is $n_{uc}$, values of the refractive indexes have to be set to satisfy the following conditions, respectively:

$n_{core} > n_{lc}$ $n_{core} > n_{uc}$, and $n_{lc} = n_{uc}$ or $n_{lc} \neq n_{uc}$.

An optical waveguide is disposed in the core layer 4. The optical waveguide is formed by an input-side single-mode waveguide 7, a wide multi-mode waveguide 8, a tapered waveguide 9 and an output-side single-mode waveguide 10. The input-side single-mode waveguide 7 is formed in a substantially linear form, and an input end thereof is exposed to the outside of the device. The input-side single-mode waveguide 7 propagates inputted light at single mode.

The multi-mode waveguide 8, which is rectangular when viewed from above, is directly connected to an output end of the input-side single-mode waveguide 7 (see FIG. 3). The longitudinal direction of the multi-mode waveguide 8 is parallel to the axial direction of the input-side single-mode waveguide 7 (the direction of arrow A in FIG. 1). The output end of the input-side single-mode waveguide 7 is connected to a central portion of the multi-mode waveguide 8 in the width direction thereof (the direction of arrow B in FIG. 1). The multi-mode waveguide 8 propagates a light wave inputted from the input-side single-mode waveguide 7 at plural guided modes.

At an output end of the multi-mode waveguide 8, the tapered waveguide 9 and the output-side single-mode waveguide 10, which is formed in a substantially linear form and is coaxial with the input-side single-mode waveguide 7, are disposed. The tapered waveguide 9 is tapered such that the width thereof in the direction of arrow B gradually decreases from the multi-mode waveguide 8 to the output-side single-mode waveguide 10, when viewed from above.

An input end of the tapered waveguide 9 is connected to the central portion of the multi-mode waveguide 8 in the direction of arrow B. The width of the output end of the tapered waveguide 9 is substantially equal to the width of the output-side single-mode waveguide 10, and the output end of the tapered waveguide 9 is connected to the output-side single-mode waveguide 10. The tapered waveguide 9 couples the light propagated through the multi-mode waveguide 8 to the output-side single-mode waveguide 10. The optical modulator according to this embodiment is a single-input single-output optical device, and the output-side single-mode waveguide 10 propagates the light at single mode and outputs the light from the device. It should be noted that the tapered waveguide 9 may be omitted and the input end of the output-side single-mode waveguide 10 may be directly connected to the output end of the multi-mode waveguide 8.

A configuration of the optical waveguide will now be described. As shown in FIG. 3, where a width of the input-side single-mode waveguide 7 is $W_1$ and a width of the multi-mode waveguide 8 is $W_2$ (in FIG. 3, a width of the output-side single-mode waveguide 10 is also $W_1$), a multi-mode interference can be obtained when a ratio $W_2/W_1$ satisfies the following conditional expression:

$1 < W_2/W_1 < 100$.

Further, a length L of the multi-mode waveguide 8 is a function of a difference in refractive index $\Delta n$ between the waveguide and an area surrounding the waveguide, the width $W_1$ of the input-side single-mode waveguide 7 and the width $W_2$ of the multi-mode waveguide 8. The length L is not significantly influenced by the difference in refractive index $\Delta n$ and the width $W_1$, however, has a weak inverse proportional relationship with each parameter ($L \propto (W_1)^{-1}$ and $L \propto (\Delta n)^{-1}$). On the other hand, an optical output power of the optical modulator is significantly influenced by the width $W_2$, and is proportional to a square of the dimension $W_2$. According to these characteristics, stability of operation can be improved by altering parameters such as the width $W_2$ and the length L depending on materials.

Figure 4:
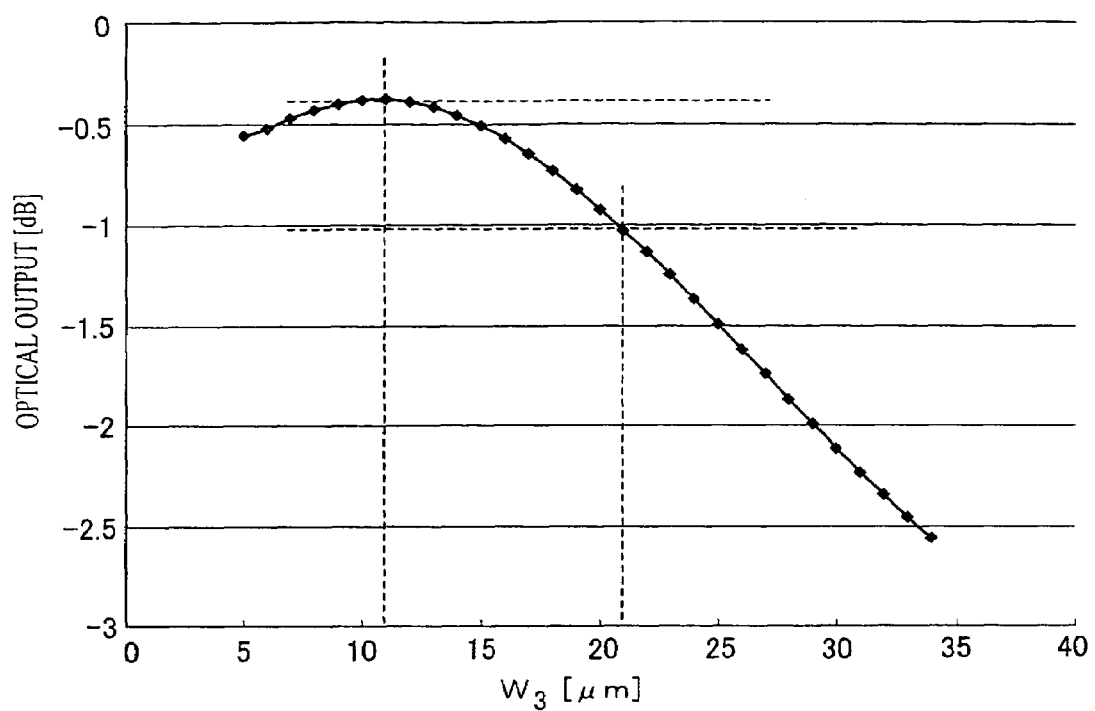
FIG. 4 is a graph illustrating a relationship between a dimension of a tapered waveguide of the optical modulator and an optical power outputted from the optical modulator.

Further, a width $W_3$ at the input end of the tapered waveguide 9 can be set depending on a total loss in the optical power of the optical modulator. As shown in FIG. 4, where the width $W_2$ of the multi-mode waveguide 8 is 75 μm, a minimum loss in the optical power is below 0.5 dB when $W_3 = 11$ μm. However, the total loss in the optical power gradually increases as the dimension $W_3$ increases, and exceeds 2.5 dB when $W_3 = 33$ μm.

Figure 5A:
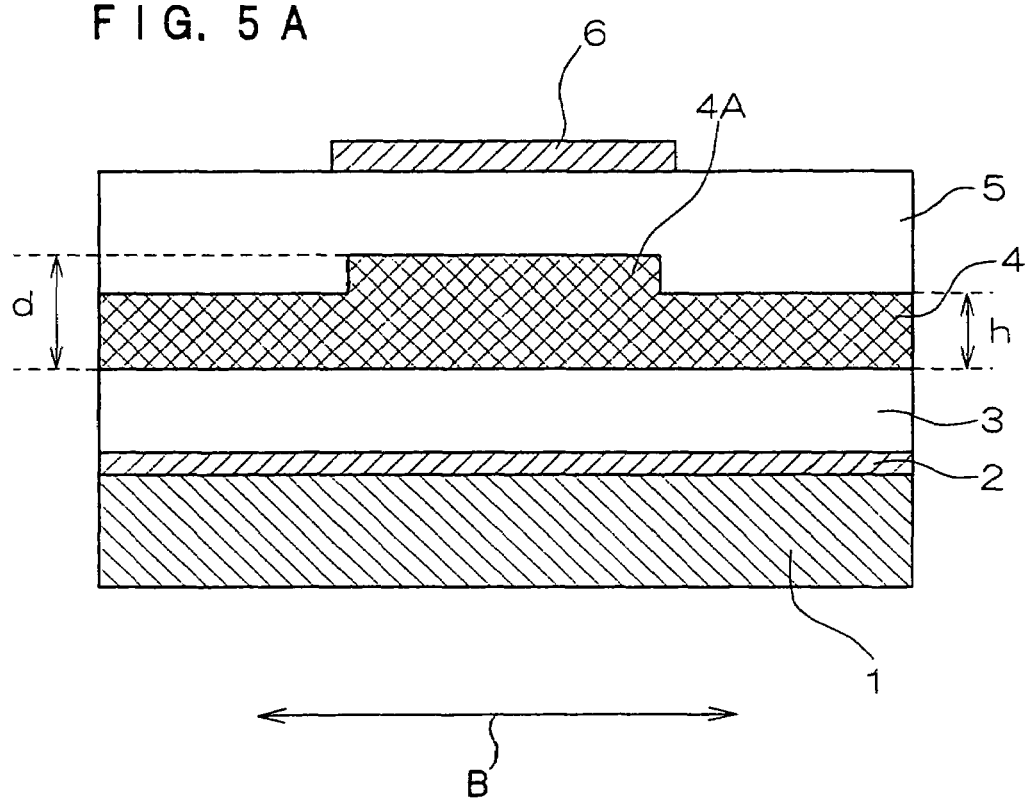
FIGS. 5A and 5B are diagrams respectively illustrating modifications of a core layer of the optical modulator.

Furthermore, in this embodiment, as shown in FIG. 5A, the optical waveguide including the core layer 4 has a rib structure where a central portion 4A in the direction of arrow B is thicker than opposite end portions of the core layer 4 in the upward direction. Where a thickness at the central portion 4A is d and a thickness at the opposite end portions is h, it is necessary in this embodiment to satisfy the following conditions:

$0.05 < h/d < 1$, $0.02 < n_{core} - n_{lc} < 0.15$, and $0.02 < n_{core} - n_{uc} < 0.15$.

Figure 5B:
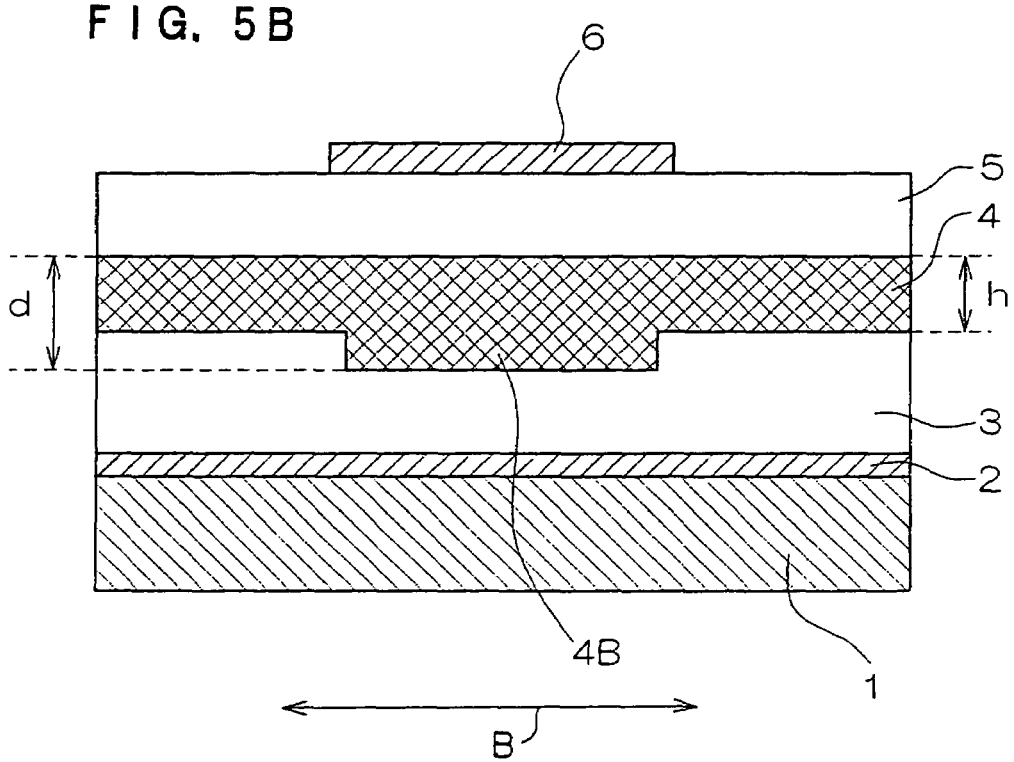

It should be noted that the configuration of the waveguide is not limited to the rib structure, and the optical waveguide may have an inverted rib structure where a central portion 4B in the direction of arrow B is thicker than the opposite end portions of the core layer 4 in the downward direction, as shown in FIG. 5B.

The upper electrode 6 is disposed, via the upper cladding layer 5, above the multi-mode waveguide 8 in the core layer 4. By applying a voltage between the upper electrode 6 and the lower electrode layer 2, an electric field is applied on the multi-mode waveguide 8.

A principle of operation of the optical modulator of the invention will now be explained with reference to FIG. 6.

As described above, the multi-mode waveguide 8 propagates the light wave inputted from the input-side single-mode waveguide 7 at plural guided modes. Therefore, when no electric field is applied on the multi-mode waveguide 8, as shown in FIG. 6A, no phase change occurs in the respective guided modes, and therefore, the inputted light wave propagates through the multi-mode waveguide 8, and the light wave having a constant intensity in accordance with an interference is outputted to the output-side single-mode waveguide 10. On the other hand, when an electric field is applied on the multi-mode waveguide 8, as shown in FIG. 6B, phase changes are caused in the respective guided modes, and due to a destructive interference at the output end of the multi-mode waveguide 8, no optical signal is transmitted to the output-side single-mode waveguide 10. In other words, the state shown in FIG. 6A is an "ON" state, and the state shown in FIG. 6B is an "OFF" state where the interference pattern in the ON state is broken.

Utilizing this principle of operation, the optical modulator of the invention functions as an optical breaker for interrupting the signal light when switching the state from the ON state to the OFF state. Further, where the phase change is gradually induced from the ON state to the OFF state, the intensity of the light can be gradually controlled. Therefore, the optical modulator of the invention functions as a variable optical attenuator for attenuating the intensity of the signal light to a desired value. Moreover, where the phase change is continuously switched between the ON state and the OFF state, the optical signal that is outputted according to this phase change can be modulated so as to be turned on and off. Therefore, the optical modulator of the invention literally functions as an optical modulator for modulating the intensity of the signal light.

As can be understood from the principle of operation explained above, the electric field applied on the multi-mode waveguide 8 varies depending on the shape of the upper electrode 6 disposed above the multi-mode waveguide 8. Therefore, the shape of the upper electrode 6 is important in the invention, and it is designed so that a desired optical output is obtained. A function of the upper electrode 6 is to generate perturbation in the multi-mode waveguide 8 so that asymmetrical phases generated in the multi-mode waveguide 8 destruct the interference pattern in the multi-mode waveguide 8 to distort a spatial distribution of an optical signal which is ultimately recombined at the output-side single-mode waveguide 10. A decrease in a coupling amount due to this perturbation translates to a coupling loss between the multi-mode waveguide 8 and the output-side single-mode waveguide 10. Therefore, by altering the perturbing electric field, the coupling loss can be controlled, and therefore, the intensity of the output signal can be controlled.

In this embodiment, as shown in FIG. 3, the upper electrode 6 is formed in a right angled triangular shape when viewed from above, which has a hypotenuse being a diagonal extending from the upper left corner to the lower right corner of the rectangular multi-mode waveguide 8. By disposing the upper electrode 6 above the multi-mode waveguide 8 in this manner, a phase change is caused in each of the guided modes, thereby generating a destructive interference at the output end of the multi-mode waveguide 8.

Further, the upper electrode 6 shown in FIG. 3 is formed such that, when it is divided into two at the center of the multi-mode waveguide 8 in the longitudinal direction thereof, an area of the upper electrode 6 at the input end side is greater than that at the output end side. Each of the guided modes, which is subjected to a phase change, propagates through the multi-mode waveguide 8, and generates a destructive interference at the output end of the multi-mode waveguide 8. Therefore, it is preferable to dispose the upper electrode 6 at the input end side of the multi-mode waveguide 8, for example, in such a manner that the area of the upper electrode 6 near the input end is greater than that near the output end.

Furthermore, the upper electrode 6 shown in FIG. 3 is formed to be asymmetrical with respect to line a–a' which divides the multi-mode waveguide 8 into two equal parts in the longitudinal direction thereof, as well as with respect to line b–b' which divides the multi-mode waveguide 8 into two equal parts in the width direction thereof. The electric field applied on the multi-mode waveguide 8 promotes generation of asymmetrical phases in the multi-mode waveguide 8, and this facilitates generation of a destructive interference, so that a greater change is obtained in the optical output.

It should be noted that a shape of the upper electrode 6 is not limited to the above-described right angled triangle. The upper electrode 6 may have any shape and size such as a triangular shape, a strip shape, a shape defined by parabola or a shape defined by an arbitrary polynomial function.

Figure 7A:
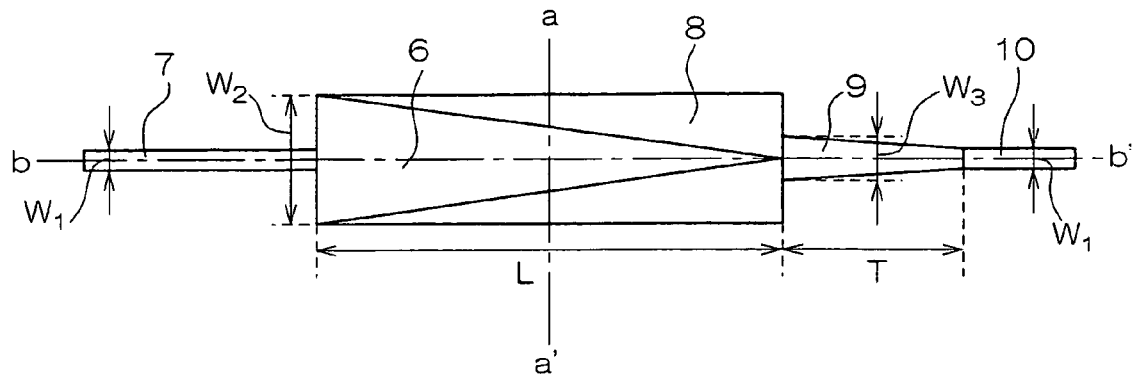
FIGS. 7A to 7C are diagrams respectively illustrating modifications of an electrode layer of the optical modulator.
Figure 8:
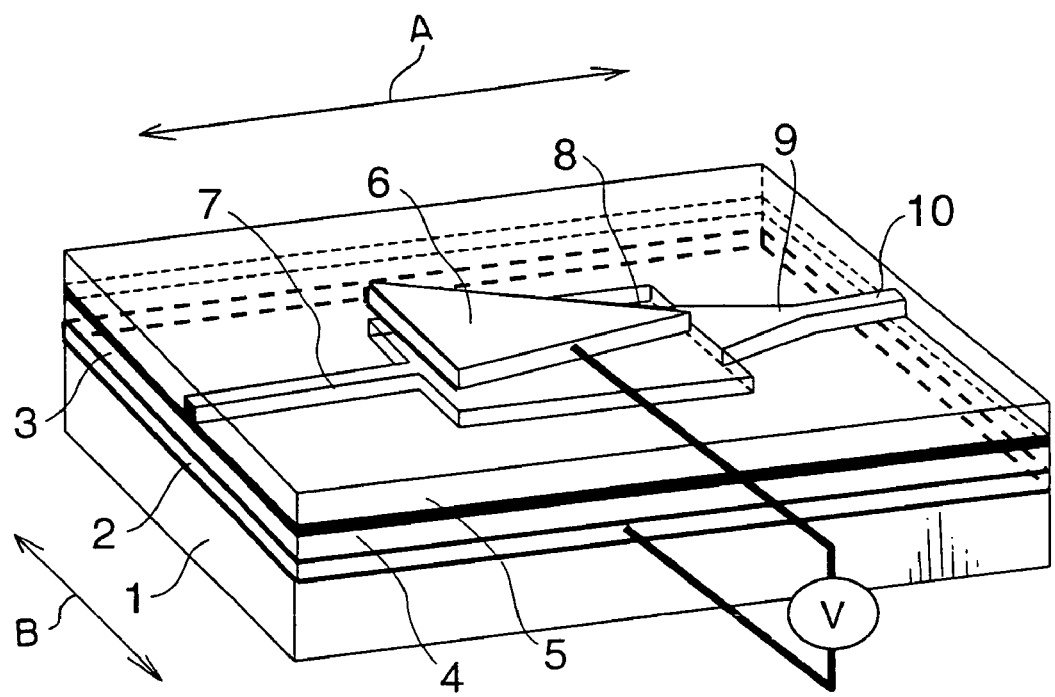
FIG. 8 is a perspective view illustrating a modification of the optical modulator.

As shown in FIG. 7A, for example, the upper electrode 6 can have an isosceles triangular shape which is disposed, when viewed from above, such that its apex is at the center of the output end of the multi-mode waveguide 8, and its base opposite to the apex is along the input end of the multi-mode waveguide 8. In this example, as with the shape shown in FIG. 3, an area of the upper electrode 6 at the input end side of the multi-mode waveguide 8 is greater than that at the output end side of the multi-mode waveguide 8, and this is preferable for generating a destructive interference at the output end of the multi-mode waveguide 8. Further, the upper electrode 6 is asymmetrical with respect to line a–a' which divides the multi-mode waveguide 8 into two equal parts in the longitudinal direction thereof, so that a greater change is obtained in the optical output. FIG. 8 shows an arrangement of an optical modulator provided with the isosceles triangular upper electrode 6.

Figure 7B:
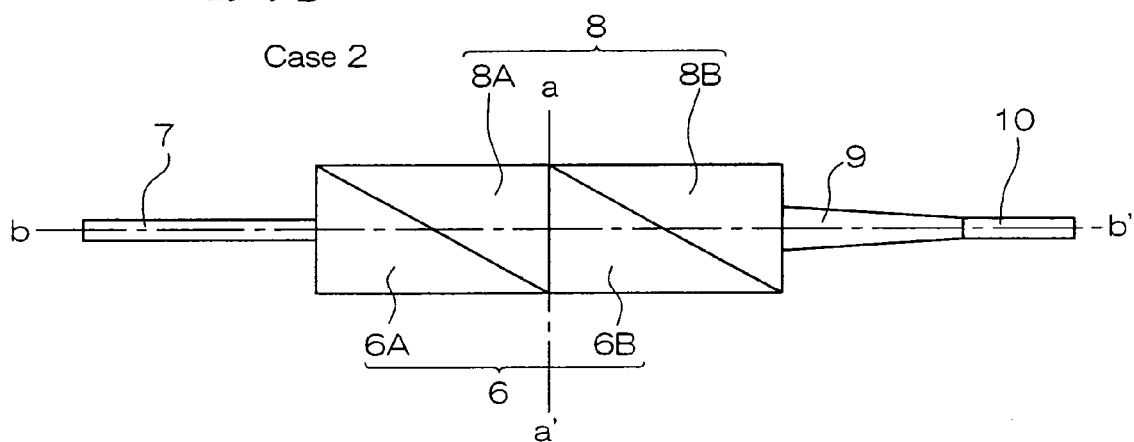

Moreover, as shown in FIG. 7B, the multi-mode waveguide 8, which is rectangular when viewed from above, is divided into two equal parts 8A and 8B in the longitudinal direction thereof, and two upper electrodes 6A and 6B, each of which has a right angled triangular shape whose hypotenuse is a diagonal from an upper left corner to a lower right corner of each of rectangular parts 8A and 8B of the multi-mode waveguide 8, can be disposed along the longitudinal direction of the multi-mode waveguide 8. In this example, as with the shape shown in FIG. 3, the upper electrodes 6A and 6B are asymmetrical with respect to line a–a' which divides the multi-mode waveguide 8 into two equal parts in the longitudinal direction thereof, as well as with respect to line b–b' which divides the multi-mode waveguide 8 into two equal parts in the width direction thereof, so that a greater change is obtained in the optical output.

Figure 7C:
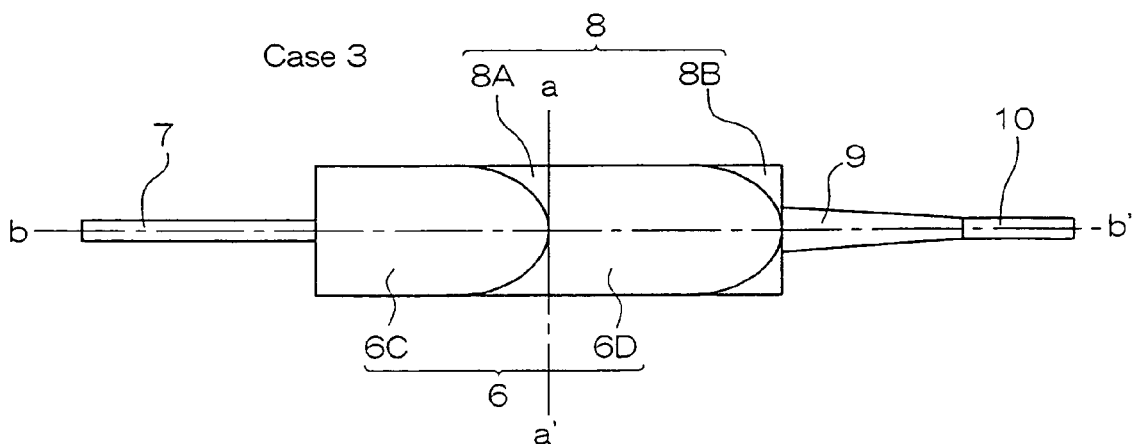

Moreover, as shown in FIG. 7C, the multi-mode waveguide 8, which is rectangular when viewed from above, is divided into the two equal parts 8A and 8B in the longitudinal direction thereof, and corresponding to each of the two rectangular parts 8A and 8B, two upper electrodes 6C and 6D can be disposed in the longitudinal direction of the multi-mode waveguide 8. Each of the two upper electrodes 6C and 6D has a so-called bullet shape where one side thereof is parabolic so as to be convex toward the output end side of the multi-mode waveguide 8. In this example, as with the shape shown in FIG. 3, the upper electrodes 6C and 6D are asymmetrical with respect to line a–a' which divides the multi-mode waveguide 8 into two equal parts in the longitudinal direction thereof, so that a greater change is obtained in the optical output.

Examples of a material for forming the substrate 1 include silicon, glass, a flexible polymer film, $SrTiO_3$, GaAs and InP. Examples of a material for forming the lower electrode layer 2 and the upper electrode 6 include gold, aluminum and copper, which can be formed by sputtering process.

Examples of a material for forming the lower cladding layer 3, the core layer 4 and the upper cladding layer 5 include those having the electro-optic effect. The lower cladding layer 3, the core layer 4 and the upper cladding layer 5 can be formed, for example, by sputtering, evaporation, chemical deposition, epitaxy or spin coating.

The rib structure can be formed by performing etching on the material of the core layer, and the inverted rib structure can be formed by performing etching on the material of the lower cladding layer. Particularly, a rectangular or linear waveguide is easily patterned. In addition, the upper electrode 6 can be patterned by a conventional method such as lift-off or wet chemical etching.

Next, operation of the optical modulator according to this embodiment is described.

Light inputted at the input end of the input-side single-mode waveguide 7 propagates through the input-side single-mode waveguide 7 at single mode. The light propagated through the input-side single-mode waveguide 7 then propagates through the multi-mode waveguide 8 at plural guided modes (multiple modes).

Where no voltage is applied between the lower electrode layer 2 and the upper electrode 6, that is, no electric field is applied to the multi-mode waveguide 8, no phase change occurs in the respective guided modes, as shown in FIG. 6A. Therefore, the light propagated through the input-side single-mode waveguide 7 propagates through the multi-mode waveguide 8, and the light wave having a constant intensity in accordance with the interference is guided through the tapered waveguide 9 to the output-side single-mode waveguide 10. Then, the light wave propagates through the output-side single-mode waveguide 10 at single mode and is outputted from the output end thereof ("ON" state).

In contrast, where a predetermined voltage is applied between the lower electrode layer 2 and the upper electrode 6, that is, an electric field is applied to the multi-mode waveguide 8, a phase change is caused in each of the guided modes of the light propagating through the multi-mode waveguide 8, and a destructive interference at the output end of the multi-mode waveguide 8 makes no light signal to be transmitted to the output-side single-mode waveguide 10 ("OFF" state).

Therefore, in order that the state of the optical modulator is instantaneously or gradually switched from the ON state to the OFF state, the intensity of the light outputted from the output-side single-mode waveguide 10 can be adjusted in accordance with a magnitude of the voltage applied between the lower electrode layer 2 and the upper electrode 6.

As an example for exhibiting effectiveness of the invention, results obtained from various embodiments are shown. Namely, using the optical modulator according to this embodiment (see FIG. 1) and the electro-optic effect, performance of the optical modulator is numerically evaluated to prove its effects and to show its function.

Refractive indexes of a material system used for the lower cladding layer 3, the core layer 4 and the upper cladding layer 5 are $n_{core}$=1.582, and $n_{lc}$=$n_{uc}$=1.471. A thickness of the lower cladding layer 3 is 3.0 μm, and a thickness d of the core layer 4 is 3.7 μm. A thickness of the upper cladding layer 5 surrounding a ridge is 3.7 μm, and the ridge having a height of 0.7 μm is formed. That is, a thickness h is 3.0 μm.

A width $W_1$ of the input-side single-mode waveguide 7 is 5 μm. A width and a height of the ridge are selected based on the ridge design scheme so as to enable single-mode operation. A width $W_2$ of the multi-mode waveguide 8 is set to 75 μm, and the length L thereof is selected to be 6400 μm. Similarly to the input-side single-mode waveguide 7, the width $W_1$ of the output-side single-mode waveguide 10 to be connected to the output end of the tapered waveguide 9 is 5 μm. A width $W_3$ of the input end of the tapered waveguide 9 is 10 μm, and a length T thereof is 1000 μm. The width of the tapered waveguide 9 is decreased at the output end thereof to 5 μm.

In this material system, resistivities of the lower cladding layer 3, the core layer 4 and the upper cladding layer 5 are respectively $5\times10^{14}$ Ω×m, $1.81\times10^{15}$ Ω×m, and $5\times10^{14}$ Ω×m. When a voltage is applied between the lower electrode layer 2 and the upper electrode 6, 70% of the electric field is confined in a core section of the cross-section between the electrodes. By reducing the resistivity of the clad material by a factor of 10, it is possible to increase the percentage of the confined electric field from 70% to a value greater than 95%. In other words, in this material system, the electro-optic effect provides a change in the refractive index of more than 0.00002 per unit voltage applied between the lower electrode layer 2 and the upper electrode 6.

Figure 9A:
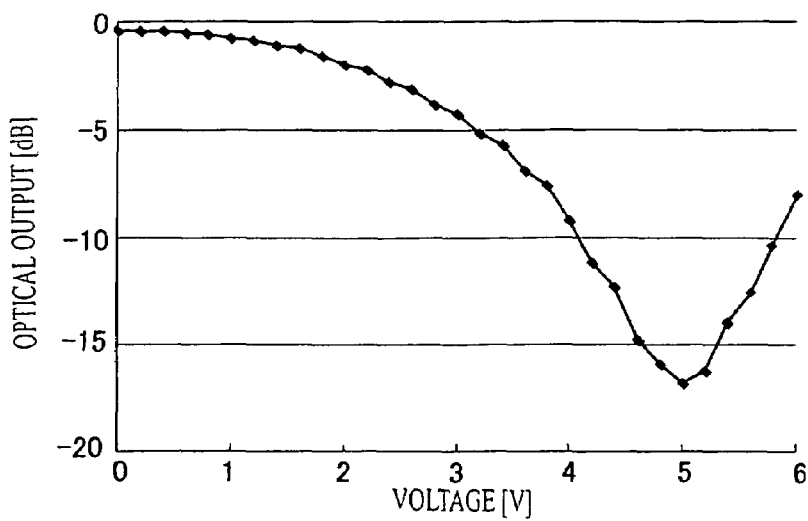
FIGS. 9A to 9C are graphs illustrating a relationship between an optical output and a voltage applied between the electrode layers, corresponding to FIGS. 7A to 7C.
Figure 9B:
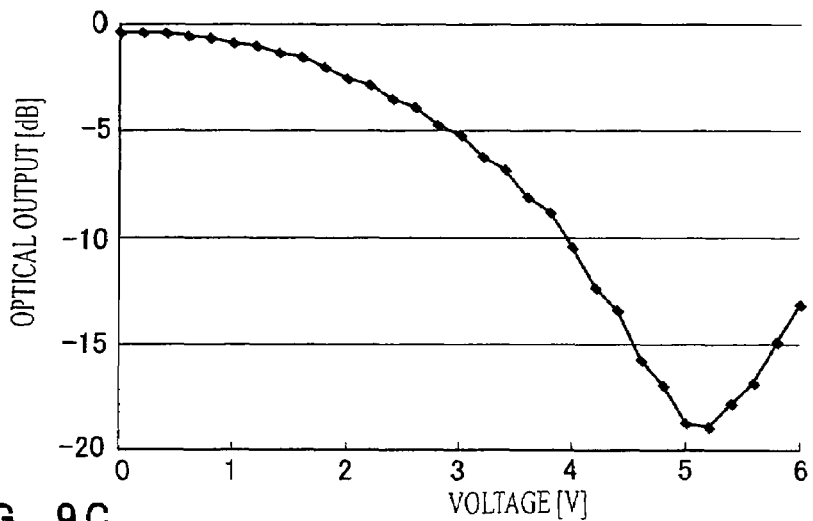
Figure 9C:
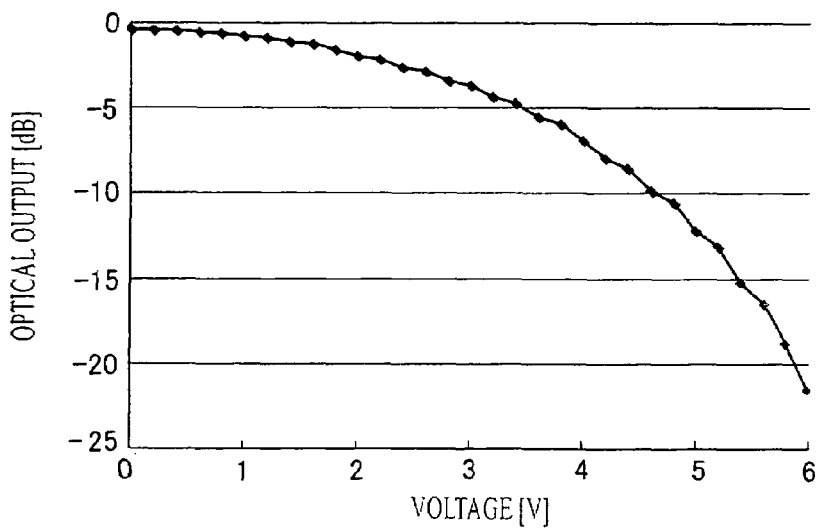

With respect to the arrangement of the optical modulator described above, a change in the optical output relating to an applied voltage is simulated with varying the shape of the upper electrode 6 as shown in FIGS. 7A to 7C. Depending on the shape of the upper electrode 6, different voltage-to-optical output characteristics are obtained. The results are shown in FIGS. 9A to 9C. As can be seen from FIGS. 9A to 9C, by changing the voltage from 0V to 6V in each case, the intensity of the optical response can be changed from 0 dB to a value over 17 dB. As shown in FIG. 9C, the shape of the electrode shown in FIG. 7C allows the intensity of the optical response to reach a value over 20 dB.

It is apparent from the above results that the optical modulator according to this embodiment has a remarkably high robustness, particularly a wide latitude to refractive indexes of materials. Namely, when a contrast ratio is detuned by 60% or more, an increase in loss is 1 dB or less. By applying this type of phenomenon, it is possible to produce a stable device with minimal drifts of thermal or electric nature. For example, in cases of polymers, it is known that, when light continuously propagates through a waveguide, a refractive index drops due to an photochemical reaction inside the waveguide. In such a polymer device, this effect makes application of the material less attractive. However, it is revealed here that, by using such robustness of this invention, a stable device can be realized.

As described above, unlike the conventionally and widely used Mach-Zehnder Modulators, the optical modulator of this embodiment has a simple optical waveguide structure. This simple optical waveguide structure is achieved by using the multi-mode waveguide as an active device involved in phase modulation, where it is not necessary to evenly split an optical power. Therefore, the optical modulator of this embodiment is easily produced and has excellent robustness.

In addition, the optical modulator of this embodiment allows highly controlled modulation of the intensity of signal light only by altering the shape of the electrode and/or a magnitude of the applied voltage, and therefore allows high degree of freedom in design.

Next, a modification of the optical modulator according to this embodiment will be described, where constitutional parts that are similar to those in the above-described embodiment are designated by the same reference numerals and descriptions thereof are omitted.

Further, as shown in FIG. 10, a multi-channel variable optical attenuator array 30 can be arranged by disposing N variable optical attenuators $20_1$ to $20_N$, to which the invention is applied, in parallel corresponding to respective channels Ch(1) to Ch(N). The variable optical attenuator array 30 attenuates optical signals by respectively applying corresponding voltages $V_1$ to $V_N$ to the variable optical attenuators $20_1$ to $20_N$, in order to equalize output intensities of the optical signals among the channels. Therefore, the variable optical attenuator array 30 can be used as an equalizer in optical networks. It should be noted that, in this application, the optical signals to be inputted to the respective channels may have the same wavelength or different wavelengths.

Figure 11A:
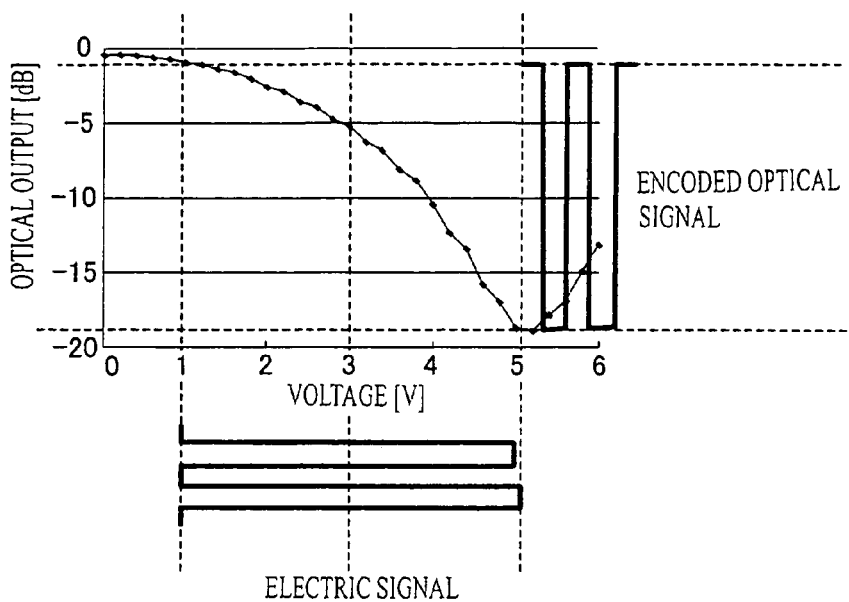
FIGS. 11A and 11B are schematic diagrams illustrating an arrangement of an optical modulator that generates an encoded optical signal.
Figure 11B:
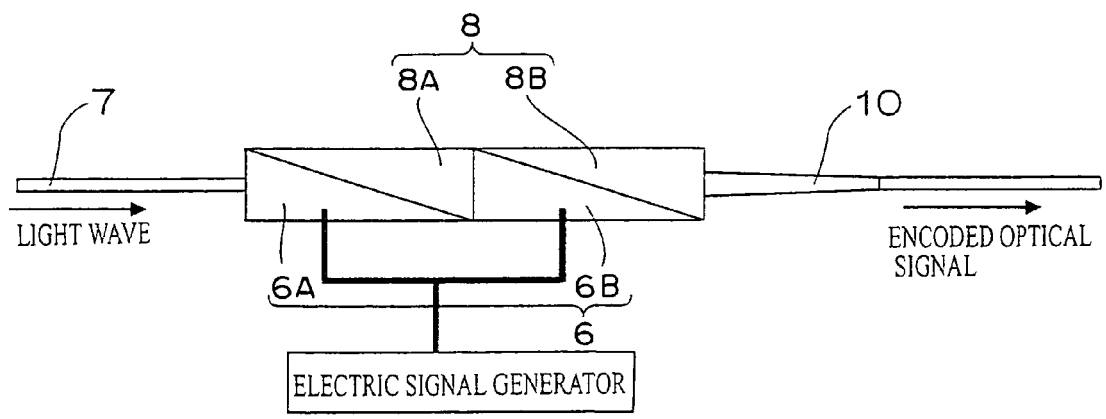

Furthermore, an optical modulator that outputs encoded optical signals can be realized by applying a reference bias voltage of 3V and applying an oscillatory electrical signal with 4V peak-to-peak, as shown in FIG. 11A. An encoded optical signal can be obtained by, for example, as shown in FIG. 11B, connecting an electric signal generator to the upper electrodes 6A and 6B having the shape shown in FIG. 7B, and modulating an optical signal, which is a continuous wave (CW), based on an electric signal outputted from the electric signal generator.

Figure 12:
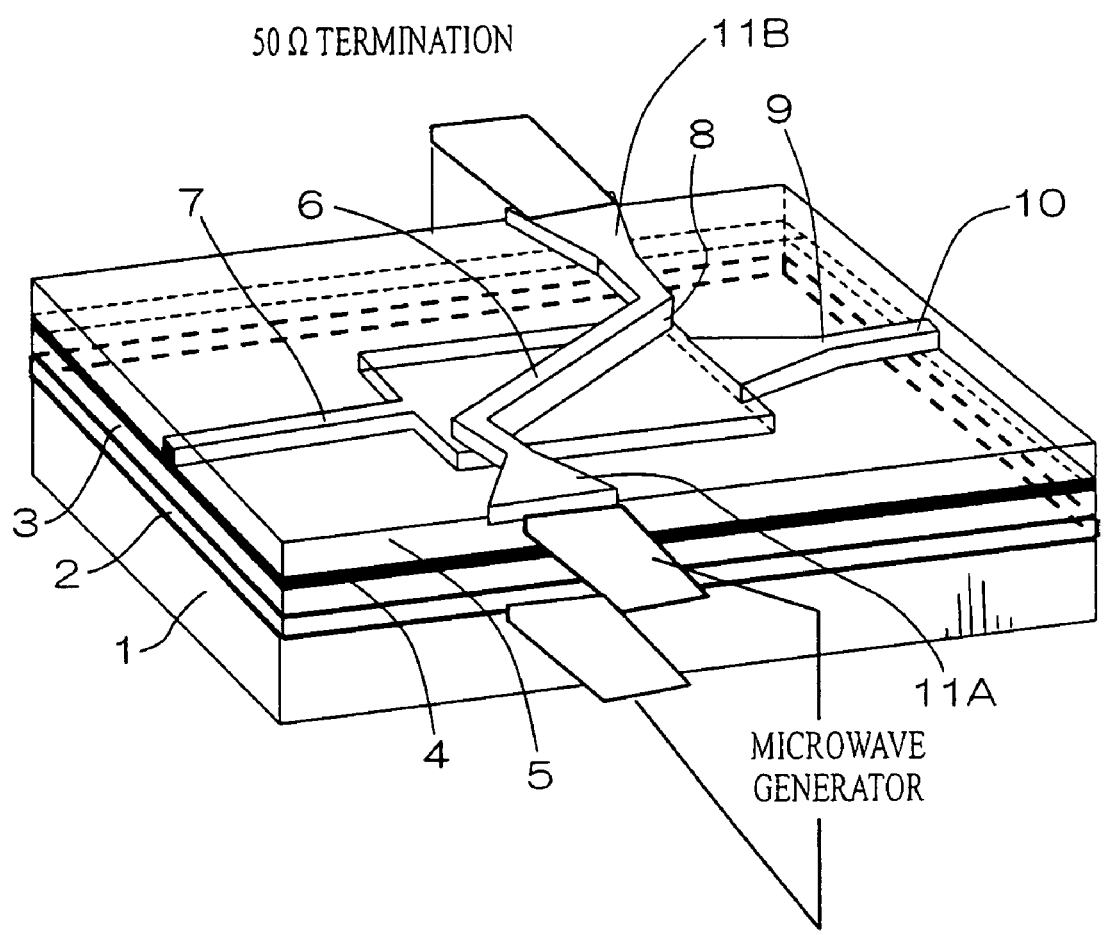
FIG. 12 is a perspective view schematically illustrating a travelling wave optical modulator, to which the optical modulator of the invention is applied.

Moreover, where the invention is applied to a traveling wave optical modulator that performs optical modulation over a wide band while matching a velocity of a light wave and a velocity of a modulated microwave, the upper electrode 6 preferably has a strip shape, as shown in FIG. 12. The strip upper electrode 6 is disposed along a diagonal from a lower left corner to an upper right corner of the multi-mode waveguide 8, which is rectangular when viewed from above. The upper electrode 6 is simultaneously used as a transmission line for the microwave, and tapered microwave strips 11A and 11B are respectively connected to opposite ends of the upper electrode 6. Further, the microwave strips 11A and 11B are respectively connected to microwave generators. In this optical modulator, the microwave propagates through the upper electrode 6 to apply an electric field to the multi-mode waveguide 8.

Figure 13:
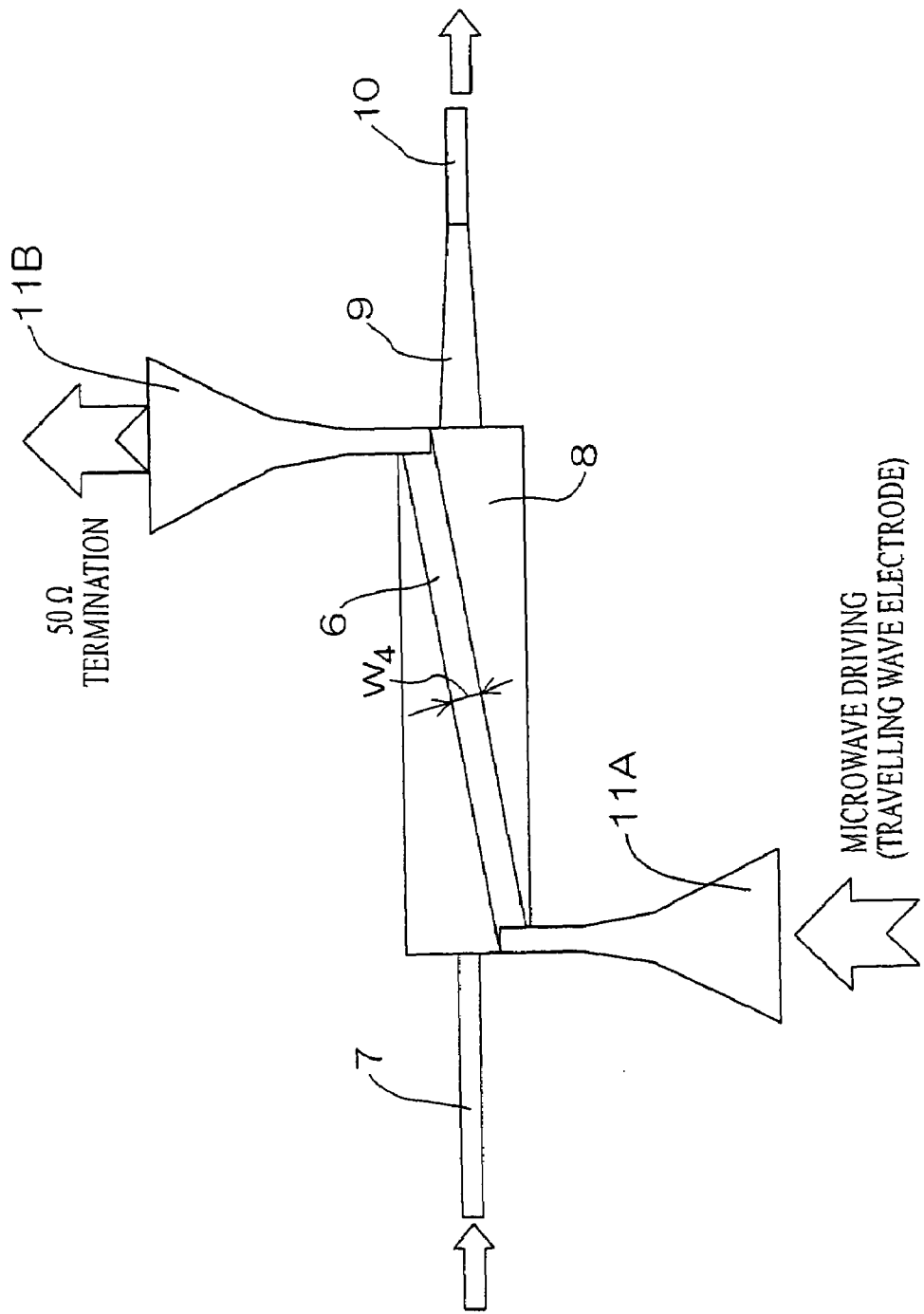
FIG. 13 is a plan view illustrating a positional relationship between a waveguide and an upper electrode of the optical modulator of FIG. 12.
Figure 14:
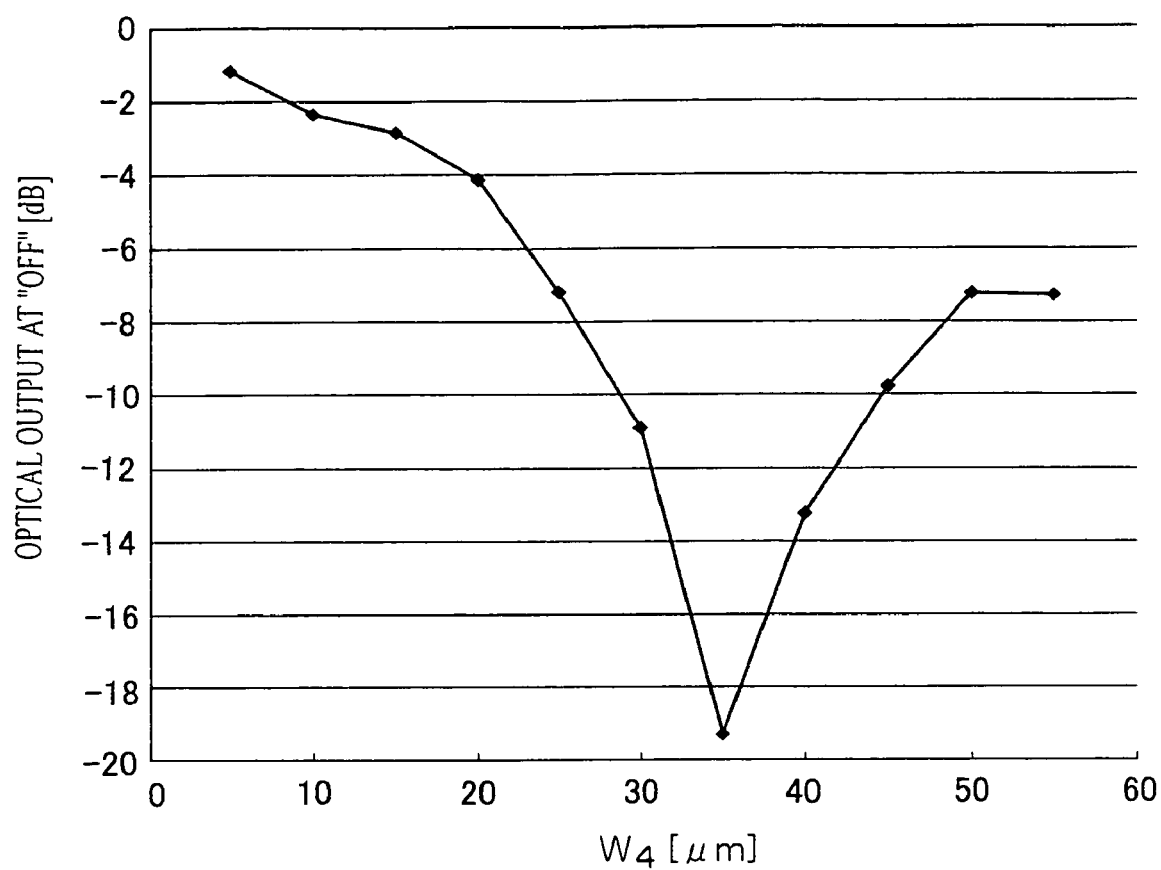
FIG. 14 is a graph illustrating a relationship between an optical output and a width of the strip upper electrode of FIGS. 12 and 13.

FIG. 14 shows a relationship between an optical output and a width $W_4$ of the strip of the upper electrode 6 (see FIG. 13). As can be seen from FIG. 14, where the width $W_4$ is 10 μm or less, there is little effect of providing the upper electrode 6, and where the width $W_4$ is 35 μm, attenuation of the optical output becomes maximum. On the other hand, where the width $W_4$ exceeds 35 μm and increases further, the optical output significantly increases.

It should be noted that the optical modulator of the invention is characterized in that an optical signal outputted from the optical modulator is modulated by varying intensity of the electric field applied to the multi-mode waveguide. Further, by gradually (statically) increasing or decreasing the intensity of the electric field, intensity of light outputted from the optical modulator is continuously adjusted. Therefore, the optical modulator can be applied as a variable optical attenuator. Moreover, by arranging the optical modulator such that whether or not the light is outputted from the optical modulator is switched by instantaneously changing the intensity of the electric field, the optical modulator can be applied as an optical switch.

Although the present embodiment has been described referring to the optical modulator utilizing the electro-optic effect, a material that causes a thermo-optic effect, where a refractive index of a medium changes depending on temperature, may be used for the multi-mode waveguide, and the interference pattern of plural guided modes of light may be changed by heating the multi-mode waveguide.

It should be noted that, in the optical modulator of the invention, the upper electrode may preferably be disposed at least in the vicinity of an input end of the multi-mode waveguide.

The upper electrode may preferably be formed such that, when the upper electrode is divided into two at a center of the multi-mode waveguide having a rectangular shape in a propagating direction of light, an area of the upper electrode near an input end side of the multi-mode waveguide is greater than that near an output end side of the multi-mode waveguide.

The upper electrode may preferably be asymmetrical with respect to a line that divides the multi-mode waveguide having a rectangular shape into two equal parts in a propagating direction of light.

The upper electrode may preferably be asymmetrical with respect to a line that divides the multi-mode waveguide having a rectangular shape into two equal parts in a direction perpendicular to a propagating direction of light.

The upper electrode may preferably be triangular when viewed from a direction facing the multi-mode waveguide.

In the optical modulator of the invention, it may be preferable that a width of the multi-mode waveguide is greater than a width of the output-side single-mode waveguide in a direction perpendicular to a propagating direction of light, and a tapered waveguide is disposed between the multi-mode waveguide and the output-side single-mode waveguide, a width of the tapered waveguide at an input end being greater than a width thereof at an output end in the direction perpendicular to the propagating direction of light.

In the optical modulator of the invention, it may be preferable that a width $W_2$ of the multi-mode waveguide and a width $W_1$ of the output-side single-mode waveguide satisfy the following relationship:

$$1 < W_2/W_1 < 100.$$

In the optical modulator of the invention, it may be preferable that the pair of cladding layers include a lower cladding layer and an upper cladding layer, and a refractive index $n_{lc}$ of the lower cladding layer, a refractive index $n_{core}$ of the core layer and a refractive index $n_{uc}$ of the upper cladding layer satisfy the following relationship:

$$n_{core} > n_{lc}$$

$$n_{core} > n_{uc}, \text{ and}$$

$$n_{lc} = n_{uc} \text{ or } n_{lc} \neq n_{uc}.$$

In the optical modulator of the invention, it may be preferable that the optical waveguide includes any one of a rib structure where a rib is formed and an inverted rib structure where a trench is formed.

In the optical modulator of the invention, it may be preferable that a thickness d at a central portion and a thickness h at opposite end portions of the optical waveguide in the direction perpendicular to the propagating direction of light satisfy the following relationship:

$$0.05 < h/d < 1,$$

$$0.02 < n_{core} - n_{lc} < 0.15, \text{ and}$$

$$0.02 < n_{core} - n_{uc} < 0.15.$$

In the optical modulator of the invention, it may be preferable that the upper electrode includes an electrode portion of any of a triangular shape, a parabolic shape, a linear shape and a shape defined by a polynomial function.

The upper electrode may preferably include a plurality of the electrode portions.

A material forming the optical waveguide may preferably include at least one of a material having an electro-optic effect and a material having a thermo-optic effect.

A width $W_1$ of the output-side single-mode waveguide and a width $W_3$ of the input end of the tapered waveguide may preferably satisfy the following relationship:

$$W_1 < W_3 < 4W_1.$$

A thickness of the upper electrode may preferably range from 0.1 µm to 5 µm.

What is claimed is:

1. An optical modulator comprising:
   an optical waveguide formed by laminating on a substrate a core layer and a pair of cladding layers sandwiching the core layer, the optical waveguide including an input-side single-mode waveguide for propagating inputted light at single mode, a multi-mode waveguide for propagating the light propagated from the input-side single-mode waveguide at a plurality of guided modes, the light being propogated through the multimode waveguide, and an output-side single-mode waveguide for propagating the light propagated from the multi-mode waveguide at single mode to output the light;
   a lower electrode layer disposed below the multi-mode waveguide; and
   an upper electrode disposed above the multi-mode waveguide, the upper electrode cooperating with the lower electrode layer to apply at least one of an electric field and heat to the multi-mode waveguide,
   wherein a phase of each of the plurality of guided modes propagating through the multi-mode waveguide is modulated by applying at least one of an electric field and heat to the multi-mode waveguide, and intensity of the light outputted from the output-side single-mode waveguide is modulated by an interference of the plurality of guided modes which are phase-modulated.

2. The optical modulator as claimed in claim 1, wherein the upper electrode is disposed at least in the vicinity of an input end of the multi-mode waveguide.

3. The optical modulator as claimed in claim 1, wherein the upper electrode is formed such that, when the upper electrode is divided into two at a center of the multi-mode waveguide having a rectangular shape in a propagating direction of light, an area of the upper electrode near an input end side of the multi-mode waveguide is greater than that near an output end side of the multi-mode waveguide.

4. The optical modulator as claimed in claim 1, wherein the upper electrode is asymmetrical with respect to a line that divides the multi-mode waveguide having a rectangular shape into two equal parts in a propagating direction of light.

5. The optical modulator as claimed in claim 1, wherein the upper electrode is asymmetrical with respect to a line that divides the multi-mode waveguide having a rectangular shape into two equal parts in a direction perpendicular to a propagating direction of light.

6. The optical modulator as claimed in claim 1, wherein the upper electrode is triangular when viewed from a direction facing the multi-mode waveguide.

7. The optical modulator as claimed in claim 1, wherein a width of the multi-mode waveguide is greater than a width of the output-side single-mode waveguide in a direction perpendicular to a propagating direction of light, and a tapered waveguide is disposed between the multi-mode waveguide and the output-side single-mode waveguide, a width of the tapered waveguide at an input end being greater than a width thereof at an output end in the direction perpendicular to the propagating direction of light.

8. The optical modulator as claimed in claim 1, wherein a width $W_2$ of the multi-mode waveguide and a width $W_1$ of the output-side single-mode waveguide satisfy the following relationship:

$$1 < W_2/W_1 < 100.$$

9. The optical modulator as claimed in claim 1, wherein the pair of cladding layers comprise a lower cladding layer and an upper cladding layer, and a refractive index $n_{lc}$ of the lower cladding layer, a refractive index $n_{core}$ of the core layer and a refractive index $n_{uc}$ of the upper cladding layer satisfy the following relationship:

$$n_{core} > n_{lc}$$

$$n_{core} > n_{uc}, \text{ and}$$

$$n_{lc} = n_{uc} \text{ or } n_{lc} \neq n_{uc}.$$

10. The optical modulator as claimed in claim 1, wherein the optical waveguide comprises any one of a rib structure where a rib is formed and an inverted rib structure where a trench is formed.

11. The optical modulator as claimed in claim 10, wherein a thickness d at a central portion and a thickness h at opposite end portions of the optical waveguide in the direction perpendicular to the propagating direction of light satisfy the following relationship:

$0.05 < h/d < 1$, $0.02 < n_{core} - n_{lc} < 0.15$, and $0.02 < n_{core} - n_{uc} < 0.15$.

12. The optical modulator as claimed in claim 1, wherein the upper electrode includes an electrode portion of any of a triangular shape, a parabolic shape, a linear shape and a shape defined by a polynomial function.

13. The optical modulator as claimed in claim 12, wherein the upper electrode comprises a plurality of the electrode portions.

14. The optical modulator as claimed in claim 1, wherein a material forming the optical waveguide comprises at least one of a material having an electro-optic effect and a material having a thermo-optic effect.

15. The optical modulator as claimed in claim 7, wherein a width $W_1$ of the output-side single-mode waveguide and a width $W_3$ of the input end of the tapered waveguide satisfy the following relationship:

$W_1 < W_3 < 4W_1$.

16. The optical modulator as claimed in claim 1, wherein a thickness of the upper electrode ranges from 0.1 μm to 5 μm.

17. An optical modulator array comprising a plurality of optical modulators arranged in an array, each of the plurality of optical modulators including:
an optical waveguide formed by laminating on a substrate a core layer and a pair of cladding layers sandwiching the core layer, the optical waveguide having an input-side single-mode waveguide for propagating inputted light at single mode, a multi-mode waveguide for propagating the light propagated from the input-side single-mode waveguide at a plurality of guided modes, the light propagated through the multimode waveguide, and an output-side single-mode waveguide for propagating the light propagated from the multi-mode waveguide at single mode to output the light;
a lower electrode layer disposed below the multi-mode waveguide; and
an upper electrode disposed above the multi-mode waveguide, the upper electrode cooperating with the lower electrode layer to apply at least one of an electric field and heat to the multi-mode waveguide,
wherein a phase of each of the plurality of guided modes propagating through the multi-mode waveguide is modulated by applying at least one of an electric field and heat to the multi-mode waveguide, and intensity of the light outputted from the output-side single-mode waveguide is modulated by an interference of the plurality of guided modes which are phase-modulated.

18. An optical modulator comprising:
an optical waveguide formed by laminating on a substrate a core layer and a pair of cladding layers sandwiching the core layer, the optical waveguide including an input-side single-mode waveguide for propagating inputted light at single mode, a multi-mode waveguide for propagating the light propagated from the input-side single-mode waveguide at a plurality of guided modes, the light being propagated through the multimode waveguide, and an output-side single-mode waveguide for propagating the light propagated from the multi-mode waveguide at single mode to output the light;
a lower electrode layer disposed below the multi-mode waveguide; and
a strip upper electrode disposed to intersect with a propagating direction of light above the multi-mode waveguide, the strip upper electrode cooperating with the lower electrode layer to apply a microwave to the multi-mode waveguide,
wherein a phase of each of the plurality of guided modes propagating through the multi-mode waveguide is modulated by applying a microwave to the multi-mode waveguide, and intensity of the light outputted from the output-side single-mode waveguide is modulated by an interference of the plurality of guided modes which are phase-modulated.

19. The optical modulator as claimed in claim 18, wherein a thickness of the strip upper electrode ranges from 0.1 μm to 5 μm.

20. The optical modulator as claimed in claim 18, wherein a width of the multi-mode waveguide is greater than a width of the output-side single-mode waveguide in a direction perpendicular to a propagating direction of light, and a tapered waveguide is disposed between the multi-mode waveguide and the output-side single-mode waveguide, a width of the tapered waveguide at an input end being greater than a width thereof at an output end in the direction perpendicular to the propagating direction of light.

21. An optical modulator array comprising a plurality of optical modulators arranged in an array, each of the plurality of optical modulators including:
an optical waveguide formed by laminating on a substrate a core layer and a pair of cladding layers sandwiching the core layer, the optical waveguide having an input-side single-mode waveguide for propagating inputted light at single mode, a multi-mode waveguide for propagating the light propagated from the input-side single-mode waveguide at a plurality of guided modes, the light propagating the light propagated from the and an output-side single-mode waveguide for propagating the light propagated from the multi-mode waveguide at single mode to output the light;
a lower electrode layer disposed below the multi-mode waveguide; and
a strip upper electrode disposed to intersect with a propagating direction of light above the multi-mode waveguide, the strip upper electrode cooperating with the lower electrode layer to apply a microwave to the multi-mode waveguide,
wherein a phase of each of the plurality of guided modes propagating through the multi-mode waveguide is modulated by applying a microwave to the multi-mode waveguide, and intensity of the light outputted from the output-side single-mode waveguide is modulated by an interference of the plurality of guided modes which are phase-modulated.

* * * * *